US006648978B2

(12) United States Patent
Liaw et al.

(10) Patent No.: US 6,648,978 B2
(45) Date of Patent: Nov. 18, 2003

(54) MEMBRANE FILTRATION FOR THICKENING AND STARCH WASHING IN CORN WET MILLING

(75) Inventors: Gin C. Liaw, Decatur, IL (US); Munir Cheryan, Urbana, IL (US); Roy O. Elmore, Atwood, IL (US)

(73) Assignee: A. E. Staley Manufacturing Co., Decatur, IL (US)

( * ) Notice: Subject to any disclaimer, the term of this patent is extended or adjusted under 35 U.S.C. 154(b) by 140 days.

(21) Appl. No.: 09/977,779

(22) Filed: Oct. 15, 2001

(65) Prior Publication Data
US 2003/0070673 A1 Apr. 17, 2003

(51) Int. Cl.[7] .................... B01D 15/00; B01D 61/00; C08B 30/00; A61K 35/78; A23J 1/00
(52) U.S. Cl. .................. 127/67; 127/53; 127/55; 127/71; 530/376; 530/414; 210/650; 210/651; 210/653
(58) Field of Search ............... 127/67, 71, 53, 127/55; 530/376, 414; 210/650, 651, 653; 426/478, 629

(56) References Cited

U.S. PATENT DOCUMENTS

| 4,144,087 | A | * | 3/1979 | Chwalek et al. | 127/24 |
|---|---|---|---|---|---|
| 4,412,867 | A | | 11/1983 | Cicuttini | 127/66 |
| 4,477,480 | A | | 10/1984 | Seidel et al. | 426/578 |
| 4,761,186 | A | | 8/1988 | Schara et al. | 127/71 |
| 5,198,035 | A | * | 3/1993 | Lee et al. | 127/67 |
| 5,385,608 | A | * | 1/1995 | Fitt et al. | 106/210 |
| 5,410,021 | A | * | 4/1995 | Kampen | 530/372 |
| 5,580,959 | A | * | 12/1996 | Cook et al. | 530/373 |
| 5,773,076 | A | * | 6/1998 | Liaw et al. | 426/656 |
| 5,932,018 | A | * | 8/1999 | Palardy | 127/67 |
| 5,968,585 | A | * | 10/1999 | Liaw et al. | 426/656 |
| 6,433,146 | B1 | * | 8/2002 | Cheryan | 530/373 |
| 2003/0003216 | A1 | * | 1/2003 | Woo et al. | 426/615 |

FOREIGN PATENT DOCUMENTS

| EP | 0 506 233 | 9/1992 |
|---|---|---|
| WO | WO91/12730 | 9/1991 |
| WO | WO98/15581 | 4/1998 |
| WO | WO99/64356 | 12/1999 |

OTHER PUBLICATIONS

PCT/US02/31523 International Search Report (Jan. 27, 2003).
Singh et al., "Membrane Technology in Corn Wet Milling," *Cereal Foods World* 42:520–525 (1997).
Singh et al., "Membrane Technology in Corn Refining and Bioproduct–Processing," *Starch/Starke* 50:16–23 (1998).

(List continued on next page.)

*Primary Examiner*—Mark L. Bell
*Assistant Examiner*—Patricia L. Hailey
(74) *Attorney, Agent, or Firm*—Williams, Morgan & Amerson

(57) ABSTRACT

An improved corn wet milling process is disclosed in which a first stream comprising water, starch, and protein (e.g., gluten) is generated by separating fiber from wet milled de-germed corn particles (e.g. fiber separation step). Membrane filtration (e.g. starch-protein stream thickening) is performed on the first stream, producing a first retentate and a first aqueous permeate. The first retentate (e.g. thickened starch-protein stream) is separated into a second stream and a third stream (e.g. primary starch separation step). The second stream comprises water and a majority of the starch present in the first retentate, and the third stream comprises water and a majority of the protein (e.g., gluten) present in the first retentate. This process provides an economical means of recovering a higher percentage of the available cornstarch for inclusion in high value products.

28 Claims, 10 Drawing Sheets

OTHER PUBLICATIONS

"Corn Refining in USA in the 21$^{st}$ Century: The Role of Membrane Technology," M. Cheryan, presented at Corn Utilization Conference, St. Louis, MO (1992) and Membrane Research Circle, Tokyo (1993) no month available.

"Corn Refining in the 21$^{st}$ Century: The Role of Membrane Technology," M. Cheryan, The Membrane Conference on Technology/Planning, BCC Communications, Newton, MA (Oct. 17, 1994–Oct. 19, 1994).

N. Singh and M. Cheryan, "Membrane Technology in Corn Wet Milling," *Cereal Food World* 42:520–525 (Jul. 1997).

N. Singh and M. Cheryan, "Microfiltration for Clarification of Corn Starch Hydrolysates," *Cereal Food World* 42:21–24 (Jan. 1997).

J. May, "Chapter 12: Wet Milling: Process and Products," *Corn: Chemistry and Technology*, edited by S. Watson and P. Ramstad, St. Paul, Minn., USA: American Association of Cereal Chemists. pp. 377–387 (1987) no month available.

N. Singh and M. Cheryan, "Membrane Technology in Corn Refining and Bioproduct–Processing," *Die Stäerke=Starch* 50:16–23 (Jan. 1998).

*Ultrafiltration and Microfiltration Handbook*, M. Cheryan, Urbana, Illinois, USA, pp. 413–419 (1998) no month available.

* cited by examiner

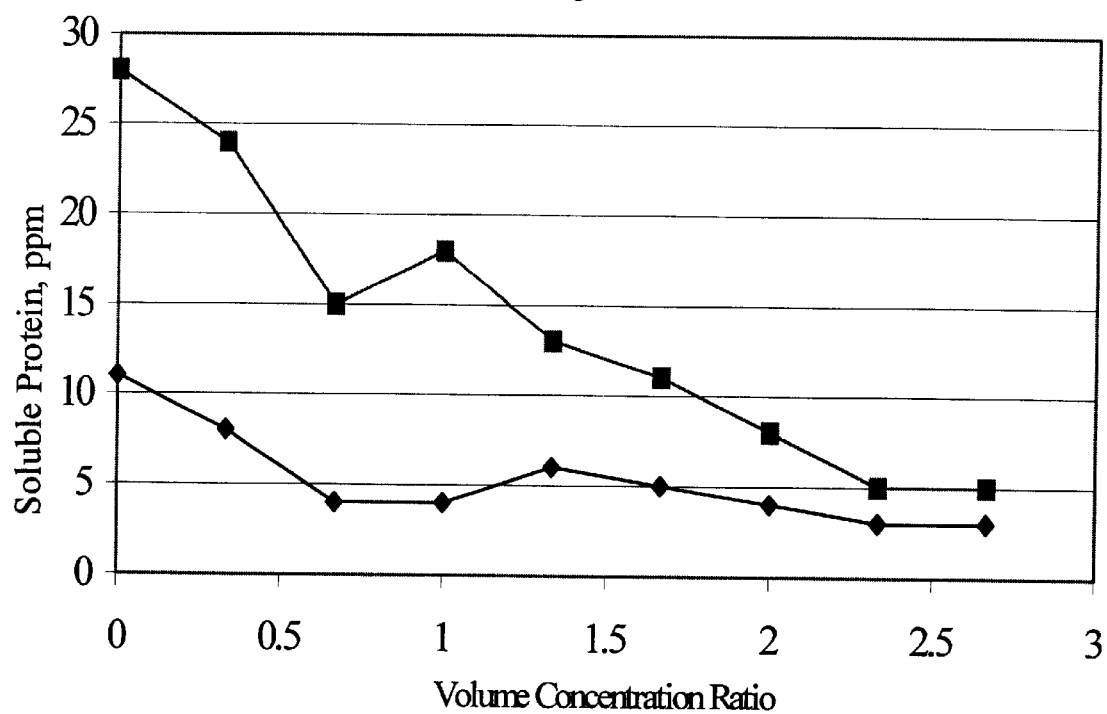

MEMBRANE FILTRATION FOR THICKENING AND STARCH WASHING IN CORN WET MILLING

BACKGROUND OF THE INVENTION

1. Field of the Invention

The present invention relates generally to the field of wet milling of corn into useful products. More particularly, it concerns enhanced recovery of starch from corn wet milling.

2. Description of Related Art

Corn kernels contain starch, protein, water, fiber, and other substances, which can be separated to make various useful products. Starch is one component of the kernel, and the starch recovered from wet milling of corn can be sold as such or can be modified using chemical or biological means to produce a variety of products with higher commercial value.

The corn wet milling process is used to refine corn kernels into end products such as starch, oil, and feed. In general, kernels of corn are steeped in an aqueous solution under controlled conditions to soften the kernels and facilitate separation of the kernels' components. After steeping, the aqueous solution, referred to as steepwater, is drawn off. The corn kernel, swollen as a result of the steeping, is then coarse-milled to allow removal of the germ. Oil is removed from the germ and refined to make corn oil. The remainder of the germ is dried to form corn germ meal, or it may be used as an ingredient in corn gluten feed.

After the germ is removed, the remainder of the kernel is milled again to pulverize endosperm particles while leaving fibrous material nearly intact. Fiber is separated from the starch and gluten by washing and screening. The fiber is then combined with the dried remains of the steepwater to make corn gluten feed.

The stream of starch and protein (e.g., gluten) that is separated from the fiber is first concentrated (e.g. thickened by removal of aqueous medium), and then the starch and protein are separated, in what is often referred to as the primary starch separation step, and the gluten is dried to form corn gluten meal. The thickening of the starch-protein stream and the primary starch separation steps are both typically done by centrifugation. The primary starch separation step yields two streams, (1) a stream that comprises the majority of the gluten from the thickened starch-protein stream (e.g. gluten stream) and (2) a stream that comprises the majority of the starch from the thickened starch-protein stream (e.g. starch stream).

The gluten stream from the primary separation step typically comprises about 3 to 5% (by weight) dry solids, which can be thickened and concentrated mechanically or by membrane filtration. The concentrated and dewatered stream is then sent to a gluten drier, to remove most of the remaining water (e.g., to about 90–95% dry solids). The dry end product is corn gluten meal.

The starch stream from the primary starch separation step is washed extensively, and fresh aqueous media is combined with the starch stream during the washing process. The amount of fresh aqueous media used in this washing stage determines the purity of the starch. Typically the starch stream comprises about 2 to 5% ds (dry solids) protein and about 12 to 17 g/L of soluble impurities when it enters into the starch washing operations. The protein content in the washed starch stream is typically reduced to less than about 1% ds by counter-current washing in a series of hydrocyclones. The aqueous wash media from the starch washing operation can be shunted from counter-current washing in the hydrocyclones to a clarifier centrifuge that is used to recover a relatively small amount of starch (e.g. typically between about 5 and 15% dry solids are recovered by clarification and these dry solids typically comprise starch, gluten, and impurities among other components) that was lost from the main starch stream during its washing. The starch recovered from the wash water is then combined with the starch-protein stream after the thickening step and before the primary starch separation step. Following washing the main starch stream comprising the majority of the starch is mechanically dewatered (e.g. with centrifuges or vacuum filters) to concentrate the starch. Some or all of the recovered starch can optionally be chemically or enzymatically modified or treated before being sold to the food, paper, or textile industries. Alternatively, the dewatered starch stream can be dried to produce dry cornstarch, which can be sold as such, or which can alternatively undergo further treatment or modification (e.g. thinning, among others) to obtain a final product.

A post-wet milling treatment of recovered starch involves hydrolyzing it to produce glucose (dextrose) and other oligosaccharides, which can in turn be used as carbon sources in fermentations from which products like ethanol and organic acids, among others, can be recovered. Furthermore clarified dextrose produced from starch can itself be sold as a sweetener or can be converted (e.g. via enzymatic treatment) to high fructose syrups, which can also be used as sweeteners. Alternatively, starch recovered from the corn wet milling that has been chemically treated (e.g. hydroxyethylated dent corn starches and thinned unsubstituted waxy maize starches) can be used in paper coating formulations to give the required rheology, water holding, and binding properties to the coating formulation.

Microfiltration and nanofiltration techniques have been used in the past in certain starch-related applications in which the starch had been treated or modified after recovery from the milling process. For example, European patent application 0,452,238 discloses using a nanofiltration membrane to filter a starch slurry, passing the dextrose in the slurry through the membrane while retaining the di-and trisaccharides, thereby producing a glucose syrup, which is about 95 wt % dextrose and 5 wt % di- and trisaccharides. European patent application 0,176,621 discloses a process for obtaining glucose from thinned starch. The process includes a separation step that produces a glucose-enriched stream and a glucose-depleted stream. Membrane-based separation is disclosed as one suitable separation technique.

It is desirable to enhance the recovery of starches in the corn wet milling process itself, prior to further modifications and treatments of the recovered starch. Thus, efficient means of concentrating and recovering the starch from various aqueous process streams are important to the overall economics of the corn wet milling process.

SUMMARY OF THE INVENTION

The present invention is directed to a corn wet milling process that comprises the steps of (1) separating wet milled de-germed corn particles into a fiber component and a first stream comprising water, starch, and protein (e.g. fiber separation step); (2) performing membrane filtration of the first stream (e.g. starch-protein stream thickening) producing a first retentate and a first aqueous permeate; (3) and separating the first retentate (e.g. thickened starch-protein stream) into a second stream and a third stream (e.g. primary starch separation step), wherein the second stream comprises water and a majority of the starch present in the first retentate, and the third stream comprises water and a majority of the protein present in the first retentate. The corn wet milling process of the present invention can comprise additional steps between membrane filtration and separating the first retentate. A majority in the present invention refers to an amount that is greater than 50% of the starting material. Thus, for example, the second stream comprises more than half of the starch that was present in the first retentate (thickened starch-protein stream).

The corn wet milling process of the present invention can further comprise washing the second stream (e.g. starch stream from the primary starch separation), which is rich in starch, with added aqueous media; and separating the washed second stream into a fourth stream and a fifth stream, wherein the fourth stream (e.g. washed starch stream) comprises water and a majority of the starch present in the second stream, and the fifth stream comprises greater than about 85 wt % water and less than about 15% dry solids. Thus, the fifth stream, or aqueous wash media, comprises water and small amounts of starch lost from the fourth stream, gluten, and impurities. Certain embodiments further comprise dewatering the fourth stream (e.g. washed starch stream) to yield a sixth stream (e.g. recovered starch stream). The sixth stream can undergo further treatments or modification or it can be dried to produce a dry recovered cornstarch.

Certain embodiments of the present invention further comprise membrane filtration (e.g. clarification) of the fifth stream (e.g. the aqueous wash media) to produce a second retentate (e.g. comprising recovered starch lost from the fourth stream) and a second aqueous permeate having less than about 2% dry solids (e.g. clarified wash media). The second retentate can be combined with the first retentate (e.g. thickened starch-protein stream) prior to the primary starch separation step, and the second aqueous permeate can be combined with the first stream prior to thickening (e.g. membrane filtration of the of starch-protein stream).

In certain embodiments of the present invention, the washed starch (fourth stream) can be treated with alkali to remove off-odor and flavor, particularly for starch that is intended for use in food. Preferably, the fourth stream has a dry solids concentration of between about 18% and 45% dry solids prior to adjusting the pH with alkali. The alkali treatment involves adjusting the pH of the fourth stream to within the range of 0.5 to 2 pH units below the pasting pH of the starch by addition of alkali to produce an alkali treated stream. Alkaline liquid can be removed or washed from the alkali treated stream (e.g. pH adjusted fourth stream) within about 5 hours of adjusting the pH. The alkali treated stream can be washed with aqueous media such that it does not alter the pH of the alkali treated stream to a pH below about 10 to produce a product starch stream. Preferably, washing occurs following removal of alkaline liquid from the alkali treated stream, but it can occur without prior removal of alkaline liquid. The product starch stream can be dried to produce a dry starch product, and if spray dried or drum dried, the dry starch product can be gelatinized. Chemical modification of starch can be performed on (1) starch present in the fourth stream before adjusting the pH with alkali or (2) starch present in the product starch stream (e.g. after pH adjustment and washing). Alkali treatment of starch can further comprise neutralizing the product starch stream (e.g. after washing step). Typically the washed product starch stream will have a pH of between about 10 and 12 prior to neutralization by the addition of a neutralizing agent that is used to adjust the pH of the product starch stream to between about 6 and 10.

Embodiments of the present invention permit the replacement of other separation equipment and techniques, such as centrifuges, with membrane filtration systems for the recovery and/or concentration of starch in certain aqueous streams in a corn wet milling process. Up to about 3× concentration and possibly more of the dry solids in the first stream comprising starch and protein (e.g., gluten) can be achieved using membrane filtration.

Processes of the present invention have the following benefits: enhanced recovery of starch per unit amount of corn processed, thereby allowing the production of a greater amount of starch-based higher value products, and lower capital costs for the equipment needed to perform the process.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 10 is a graph soluble protein versus volume concentration ratio of starch diafiltration (retentate ♦, permeate ■) for Example 3 in which membrane diafiltration was performed on a starch slurry.

DESCRIPTION OF ILLUSTRATIVE EMBODIMENTS

Various embodiments of corn wet milling processes, or parts thereof, are described in this patent. Any portion of the processing not expressly discussed in this patent would be generally like previously known corn wet milling processes, for example as described in Corn Wet Milled Feed Products (Corn Refiners Association 1989).

Figure 1:
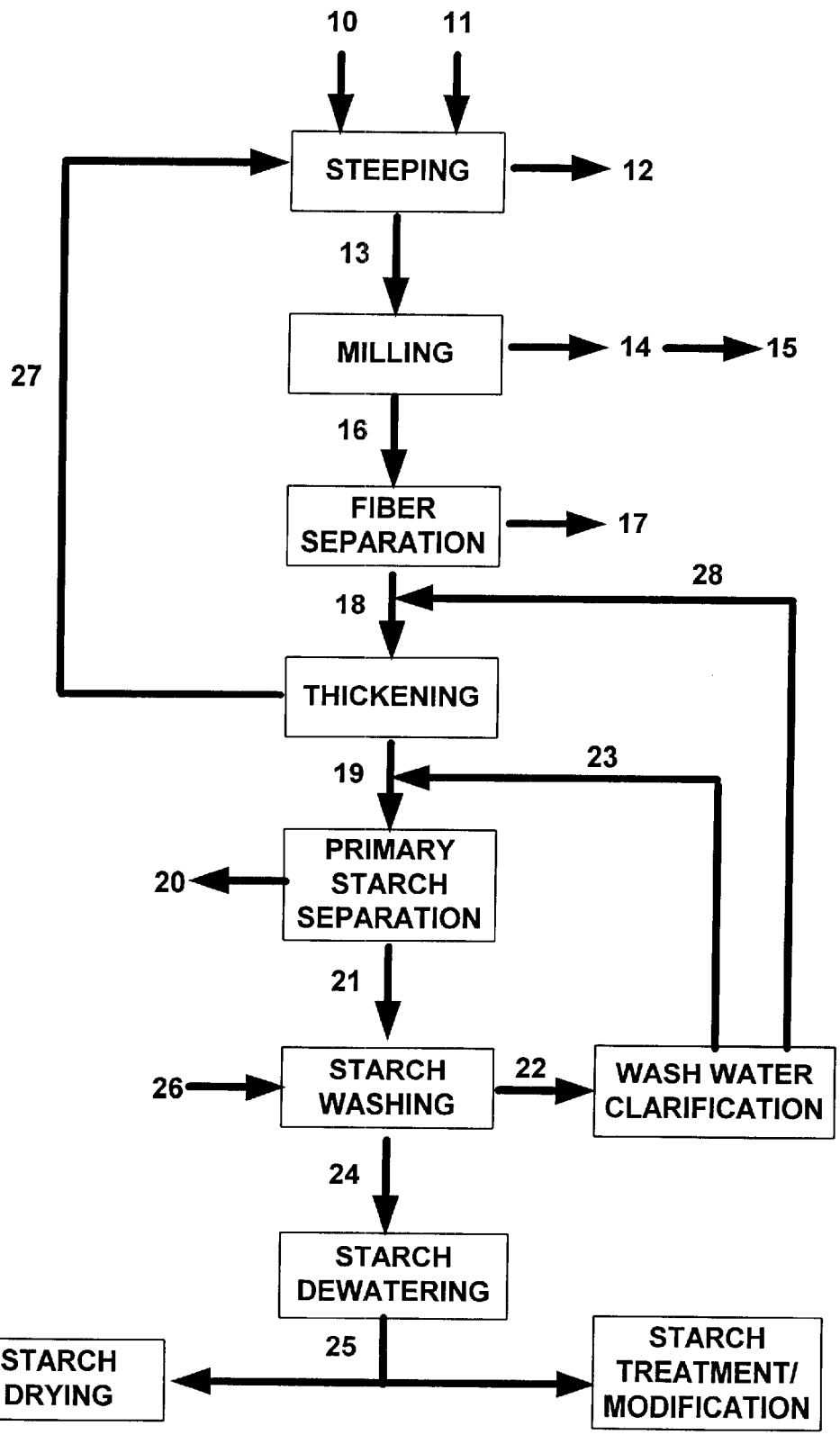
FIG. 1 is a schematic of a corn wet milling process of the present invention.

Certain embodiments of the corn wet milling process of the present invention can be better understood by referring to FIG. 1. Corn 10 and aqueous media 11 undergo steeping to soften the kernels to facilitate separation of the various components of the kernels. After steeping, aqueous steep liquor 12 is removed which comprises solubles soaked out of the corn 10, and which undergoes further processing. Steeped corn 13 is coarse milled and the germ 14 is removed and further processed. Corn oil 15 can be extracted from the germ 14.

Wet milled de-germed corn particles 16 are subjected to fiber separation through washing and screening and fiber 17 is removed. The other product of the fiber separation step is a first stream 18 comprising starch and protein (e.g., gluten). The first stream typically comprises about 10% to 20% dry solids (ds). The first stream 18 next undergoes thickening using membrane filtration.

Membrane filtration (e.g. thickening) of the first stream 18 results in a first retentate 19 and a first aqueous permeate 27. The first aqueous permeate 27 comprises up to about 5% (by weight) dry solids and can be recycled to the steep tanks. Preferably the first stream 18 is concentrated up to about a factor of about 3 in the first retentate 19. The first retentate 19 is greatly enriched in starch and gluten (e.g. they are concentrated or thickened) relative to the first stream 18. The first retentate can comprise about 20% to 35% ds. The % ds in the first retentate 19 is greater that that of the first stream 18.

The membrane filtration of the first stream 18 is accomplished using at least one microfiltration membrane selected from the group consisting of spiralwound membranes, tubular membranes, and polymeric or inorganic membranes. Ceramic membranes, like those from CeraMem (Waltham, Mass.), USFilter (DeLand, Fla.), PCI (England), and Gravier (GlassGow, Del.) are particularly preferred. Preferably, the one or more microfiltration membranes used for thickening the first stream 18 have a pore size of between about 0.005 microns and 0.2 microns. Ceramic membranes with about 2 to 6 mm channels are preferred. It is preferred that a transmembrane pressure of between about 15 and 75 psi be maintained during membrane filtration of the first stream. The flux across the membrane during membrane filtration of the first stream 18 preferably varies from between about 4 to 50 GFD (gallons/ft$^2$/day), depending on the pore size of the membrane and operating conditions. For example, under equivalent conditions of membrane filtration of the first stream (both membranes having 2 mm channel size and 1.5 ft$^2$ of surface area and a transmembrane pressure maintained at about 17.5 psi and pressure drop of 5 psi with a system temperature of about 120° F.) a CeraMem membrane having a pore size of 0.005 microns can have a flux of between about 4 to 6 GFD, while a CeraMem membrane having a pore size of 0.2 microns can have a flux between about 20 to 50 GFD. Furthermore flux tends to decrease somewhat as the retentate becomes more concentrated.

The first retentate 19 (e.g. thickened first stream from the membrane filtration) is subjected to a primary starch separation step which can be accomplished by centrifugation and which yields a second stream 21 comprising the majority (e.g. >50% by weight) of the starch and a third stream 20 comprising the majority of the gluten from the first retentate 19. The third stream 20, which is rich in gluten, can be further processed for use in such products as corn gluten meal.

In certain embodiments of the present invention, the second stream 21, which is rich in starch can undergo a starch washing step in which fresh aqueous media 26 is combined with the second stream 21. The washing step can take place in a series of hydrocyclones in which a countercurrent of the aqueous media 26 is used to purify the starch that is present in the second stream 21. The washing step results in (1) a fifth stream 22 comprising the wash media (e.g. aqueous media 26 along with small amounts of starch, gluten, and impurities removed from the second stream 21); and (2) a fourth stream 24 that comprises the majority of the starch from the starch rich second stream 21.

The fourth stream 24 comprises about 30% to about 40% ds and can then undergo dewatering, yielding a sixth stream 25 (e.g. recovered starch stream with between about 40% and 60% ds) which can be dried or can undergo further treatment or modification. Dried starch can be an end product or the dried starch can undergo further treatment or modification (e.g. thinning). The fifth stream 22 comprising the wash media from the starch washing step preferably comprises greater than about 85 wt % water and up to about 15% dry solids (wherein the dry solids comprise starch), and it can further undergo membrane filtration, to clarify it.

The second retentate 23 of the membrane filtration of the fifth stream (e.g. wash media) which comprises the majority of the starch that was present in the fifth stream 22 along with gluten and impurities, can then be combined with the first retentate 19 prior to the primary starch separation step to undergo another round of primary starch separation and washing. Typically, the second retentate 23 can comprise between about 20% and 30% dry solids comprising starch, among other components, which can represent up to about a 3 fold higher concentration of dry solids than is present in the fifth stream 22. Membrane filtration of the fifth stream 22 also results in a second aqueous permeate 28 that can comprise less than about 2% ds. This second aqueous permeate 28 can be combined with the first stream 18 (e.g. starch-protein stream prior to thickening).

Preferably the membrane filtration of the fifth stream 22 is performed using at least one microfiltration membrane selected from the group consisting of spiralwound membranes, tubular membranes, ceramic membranes and inorganic membranes. Inorganic membranes (such as those available from CeraMem) and spiralwound membranes (such as those available from Koch (Wilmington, Mass.)) are preferred, and ceramic membranes are particularly preferred.

Preferably, the one or more microfiltration membranes used for thickening the fifth stream 22 have a pore size of between about 0.005 microns to about 0.2 microns. Ceramic membranes with about 2 to 6 mm channels are preferred for filtration of the fifth stream 22, as are spiralwound membranes with a spacer of between about 80 mil and 120 mil (e.g. Koch 3838-MFK-618-FYT). If the membrane used is a CeraMem membrane, it is preferred that a transmembrane pressure of between about 17 and 75 psi be maintained during membrane filtration of the fifth stream 22, more preferably the transmembrane pressure is between about 17 and 43 psi. The flux across a CeraMem membrane during membrane filtration of the fifth stream 22, in some embodiments, can vary from between about 8 to 26 GFD (gallons/ft$^2$/day), depending on the pore size of the membrane. For example, under equivalent conditions of membrane filtration of the fifth stream 22 (both membranes having 2 mm channel size and 1.5 ft$^2$ of surface area and a transmembrane pressure maintained at about 17.5 psi and pressure drop of 5 psi with a system temperature of about 130° F.) a CeraMem membrane having a pore size of 0.005 microns can have a flux of between about 15 to 8.5 GFD, while a CeraMem membrane having a pore size of 0.2 microns can have a flux between about 26 to 18 GFD. Flux can fall off as the retentate becomes more concentrated.

In certain embodiments of the present invention, the fourth stream 24 (e.g. the starch rich stream that has been washed) can further undergo alkali treatment. Alkali treatment is used to remove off-flavor and odors from starch, particularly when the starch is to be used in making certain foods. The alkali treatment can be performed on the fourth stream 24 directly. Alternatively, the fourth stream 24 can be either diluted or concentrated prior to treatment and/or starch in the fourth stream can be chemically modified prior to adjusting the pH with alkali. Preferably the fourth stream that is alkali treated will have a concentration of between about 18% and 45% ds prior to addition of the alkali, more preferably between about 35% to 43% ds.

The alkali treatment involves adjusting the pH of the fourth stream 22 to within the range of 0.5 to 2 pH units below the pasting pH of the starch by addition of alkali, preferably in the form of an alkaline solution. Two types of corn typically used in corn wet milling are waxy maize and dent corn. Waxy maize starch has a pasting pH of about 12.5, while dent corn starch has a pasting pH of about 12.4. The adjusted pH of the fourth stream 22 should be greater than 10 but less than the pasting pH of the starch. Preferably the pH is within 2 pH units, more preferably 1 pH unit, and most preferably, with the exception of waxy maize starch, within 0.5 pH units below the pasting pH. (Pasting does not occur as a sharp transition at a particular pH, and waxy maize starch has a pH range over which it becomes increasingly viscous.) With waxy maize starch it is preferred that the pH be adjusted to between about 10.5 and 12, and more preferably between about 11.5 and 12. With dent corn starch it is preferred that the pH be adjusted to between about 11.5 and 12.3.

Any alkali, which will raise the pH of the fourth stream 24 to greater than 10 is acceptable, but food grade alkalis are preferred. Examples of preferred grade alkalis include carbonates, phosphates, and hydroxides of the alkali metals, alkaline-earth metals, ammonium and organic alkalis. Particularly preferred food grade alkalis are alkali or alkaline-earth metal hydroxides.

Alkaline liquid preferably is removed or washed from the pH adjusted fourth stream 24 within about 5 hours of adjusting the pH producing an alkali treated stream, preferably within less than 1 hour, and more preferably within about one half hour. The closer the alkaline pH is to the pasting pH, the less time that is required to remove off-tastes or odors, thus affecting the preferred length of time before removal or washing away of alkaline liquid. The alkali treated stream 24 can be washed with aqueous media such that it does not alter the pH of the alkali treated stream to a pH below about 10 to produce a product starch stream. Preferably, the washing occurs after alkaline liquid is drained off. Washing of the alkali treated stream can be performed by methods known in the art, such as centrifugation, counter-current washing, settling, filtration, or some combination of two or more methods. The alkali treated stream can be washed several times to produce a product starch stream. The product starch stream can undergo chemical modification. Furthermore, the product starch stream can be dried using means known in the art to produce a dry starch product. When the method of drying involves spray drying or drum drying, the starch can be gelatinized.

Alkali treatment can further comprise neutralization of the product starch stream by addition of a neutralizing agent to adjust the pH of the product starch stream to between about pH 6 and pH 10. Preferably the neutralizing agent comprises a food grade acid, such as citric, hydrochloric, phosphoric, sulfuric acid, or combinations thereof.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Mill Stream Thickening by Microfiltration

In a typical corn milling process, the stream (e.g. after fiber washing and separation) being fed into the mill stream thickener (e.g. centrifuge) comprised about 17.6 wt % total solids and the flowrate of the feed stream into the thickener was about 2147 GPM. After the mill stream thickening step, the volume of the feed stream had been concentrated by about 1.54x and the total solids were concentrated by a factor of about 1.76. The aqueous media removed in this step was recycled to the steep tanks at a flowrate of about 705 GPM and comprised about 3.6 wt % total solids (TS). The thickened starch stream comprised about 23.6 wt % total solids and had a flowrate of about 1390 GPM to the primary starch separator (PSS). The objective was to replace the mill stream thickener (MST) with a membrane process.

The ceramic membranes used were CeraMem lab module, 2 mm channels, 0.2$\mu$ pore size, 1.5 ft$^2$ membrane area and CeraMem lab module, 2 mm channels, 0.005$\mu$ pore size, 1.5 ft$^2$ membrane area.

The typical mill stream thickener feed that was tested with the membrane process had about 17.6 wt % total solids.

Figure 2:
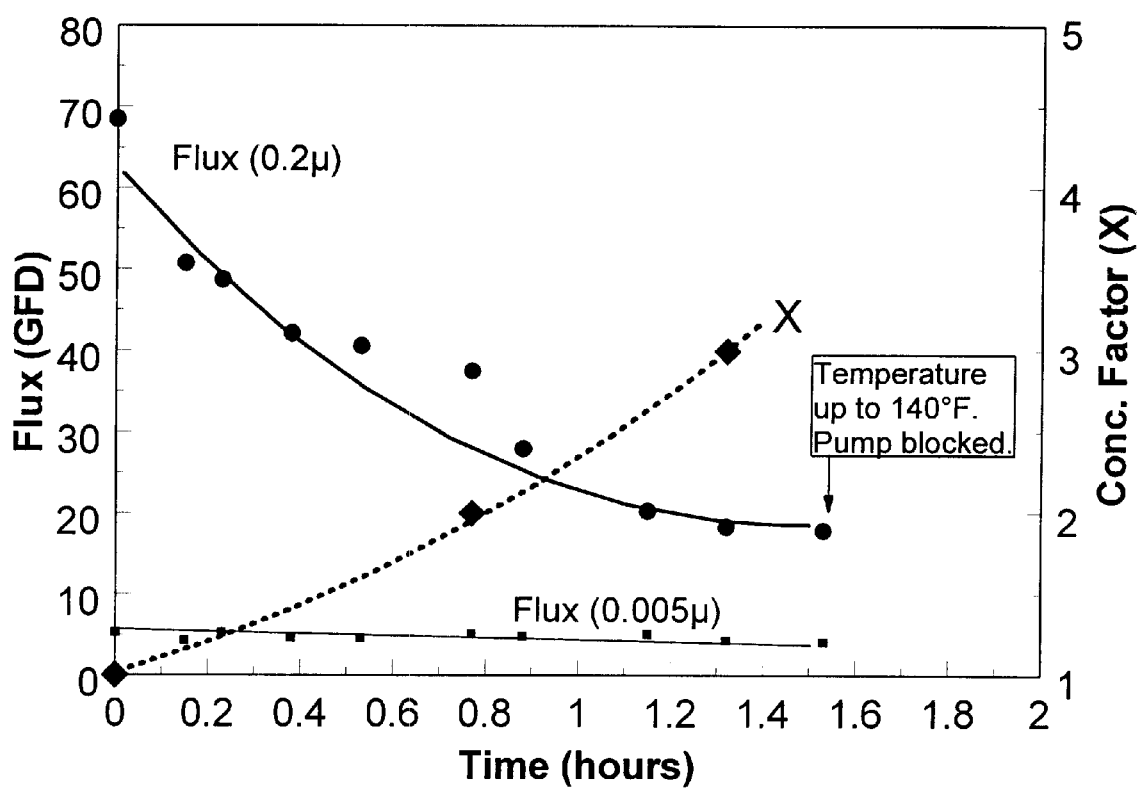
FIG. 2 is a graph of flux (0.2 micron membrane ●, 0.005 micron membrane ■) and concentration factor (♦) data versus time for Example 1 in which ceramic membranes were used to thicken a starch-protein stream. Treatment conditions were CeraMem (2-mm, 1.5 ft$^2$), 120° F., ΔP=5 psi, and transmembrane pressure (TMP)=17.5.
Figure 3:
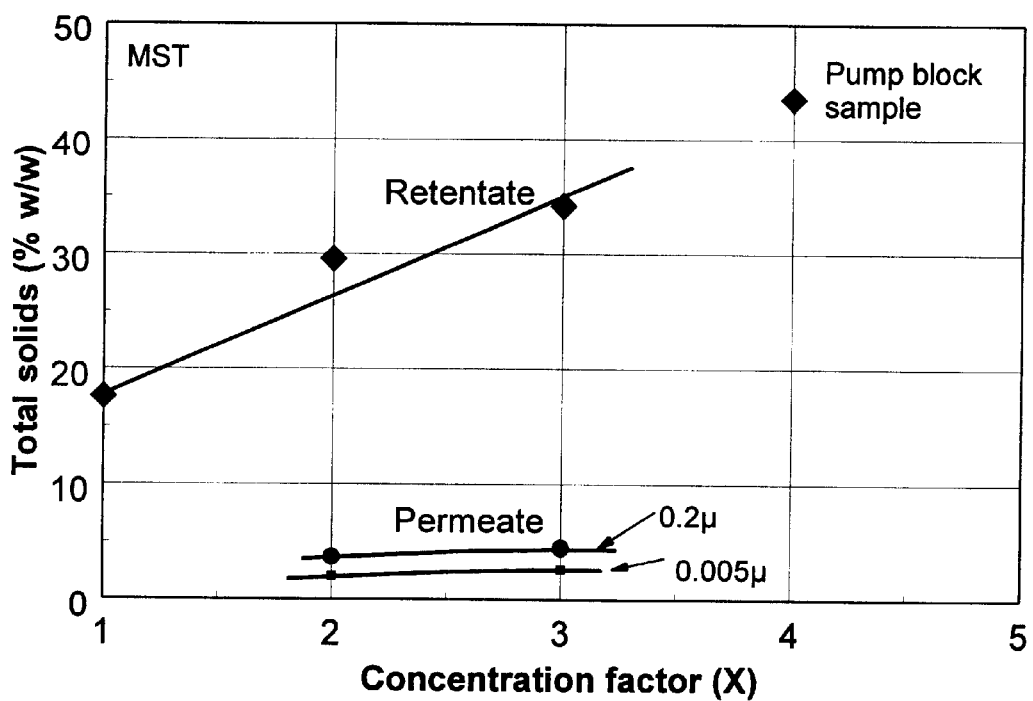
FIG. 3 is a graph of total solids versus concentration factor (retentate ♦, permeate of 0.2 micron membrane ●, permeate of 0.005 micron membrane ■) for Example 1 in which ceramic membranes were used to thicken a starch-protein stream.

FIGS. 2 and 3 show data obtained with the CeraMem membranes. Both membranes were operated together in the same batch recycle system in parallel (retentate returned to the feed tank, permeate removed from the system). FIG. 2 shows an initial flux of about 62 GFD dropping to about 20 GFD at 3x concentration (about 34% TS) with the 0.2$\mu$ membrane. The tighter membrane gave about 5 GFD at all x (concentration) values. Above 3x, it became impossible to control the temperature at about 120° F. and there was a runaway gelatinization in the pump and all the piping (the pump impeller actually stopped turning when an attempt was made to push the concentration level above 3x). The retentate sample dug out from inside the pump head and piping had a TS of 43.5%.

The correlation between TS (total solids) and x (concentration factor) is shown in FIG. 3. The 0.005μ CeraMem had lower permeate solids (about 2 to 2.6 wt % versus about 3.7 to 4.5 wt % for the CeraMem 0.2μ membrane. In this application (compared to other applications) the tighter CeraMem membrane appeared to be losing less solids in the permeate.

The permeate was absolutely clear in all cases initially. After overnight storage of the permeates in the refrigerator, there was a thin layer of fine white solids in the bottom of the sample bottles. It could be that some soluble starch escaped through the pores into the permeate (white solids were also observed with all membrane permeates). Cleaning of the blocked CeraMem membranes took several cycles.

Thus the mill stream thickener centrifuge could be replaced with a membrane filtration process. The membrane process can result in higher solids and lower flow rate to the primary starch separator (PSS), and a cleaner permeate with no suspended solids going to the steep tanks. It is predicted that a feed stream of about 17 wt % total solids at a flow rate of about 2150 GPM undergoing membrane filtration using a ceramic filter achieves about a 2x level of concentration of the stream and a flux of about 20 GFD. The retentate (e.g., thickened stream) comprises about 30 wt % total solids and has a flow of about 1075 GPM to the primary starch separator. The permeate is recycled to the steep tanks at a flowrate of about 1075 GPM with about 4 wt % total solids.

EXAMPLE 2

Clarifier Microfiltration

In a typical corn wet milling process, the clarifying step had the following conditions. Starch washings from the starch washing step had a flowrate of about 1240 GPM with about 6.7 wt % entering the clarifier (e.g. centrifuge). The clarifier concentrated the stream volume by a factor of about 4.5 and the total solids by a factor of about 4. The concentrated starch washings comprising about 27 wt % TS had a flowrate of about 275 GPM as they were recycled to the primary starch separator. The aqueous media recovered by the clarifier had about 1 wt % TS and had a total flowrate of about 923 GPM as it was sent to the fiber wash (about 870 GPM and about 1 wt % TS) and to the primary starch separator (about 53 GPM and about 1 wt % TS). The objective was to replace the clarifier with a membrane process.

Membranes tested include a spiral polymeric membrane (Koch 3838-MFK-618-FYT membrane (0.1μ, 3.8"x38", 80-mil spacer, 34 ft$^2$) and ceramic membranes (CeraMem lab module, 2 mm channels, 0.2μ pore size, 1.5 ft$^2$ membrane area and CeraMem lab module, 2 mm channels, 0.005μ pore size, 1.5 ft$^2$ membrane area).

The total solids of the clarifier feed stream varied between about 11.4 and 14 wt %.

Figure 4:
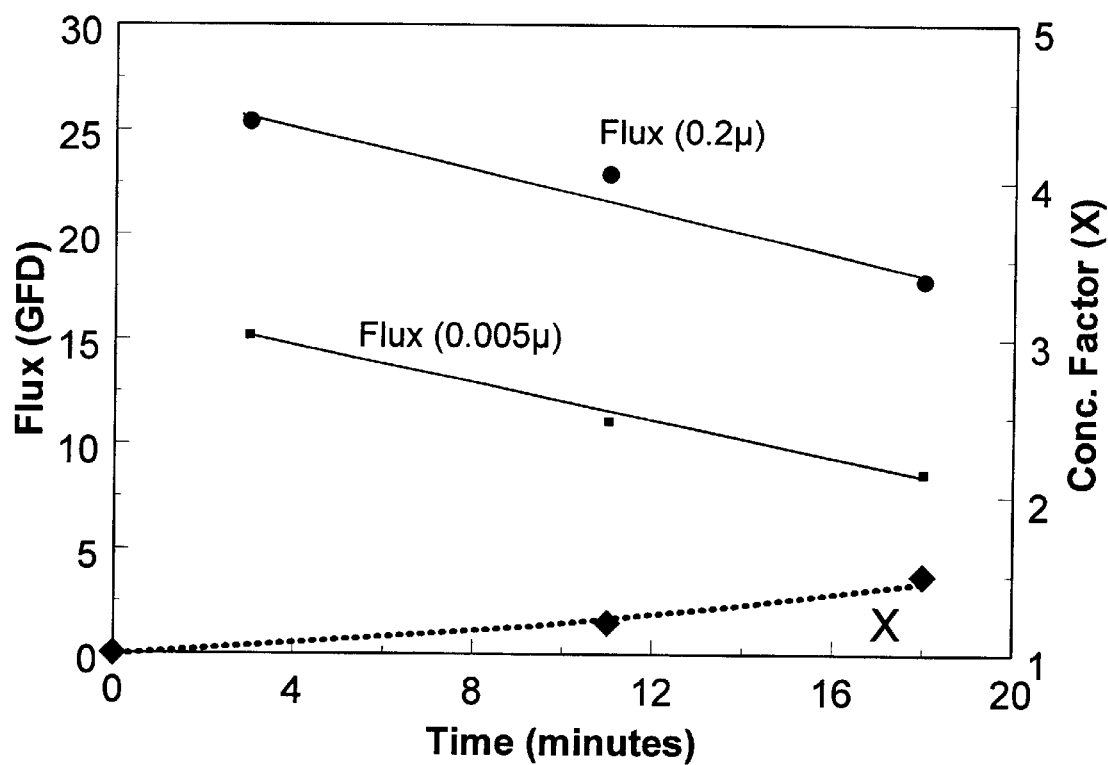
FIG. 4 is a graph of flux (0.2 micron membrane, 0.005 micron membrane ■) and concentration factor (♦) data versus time for Example 2 in which ceramic membranes were used in place of a clarifier at a temperature of about 130 degrees F. Treatment conditions were CeraMem (2-mm, 1.5 ft$^2$), 130° F., ΔP=5 psi, TMP=17.5, and initial volume=10 liters.
Figure 5:
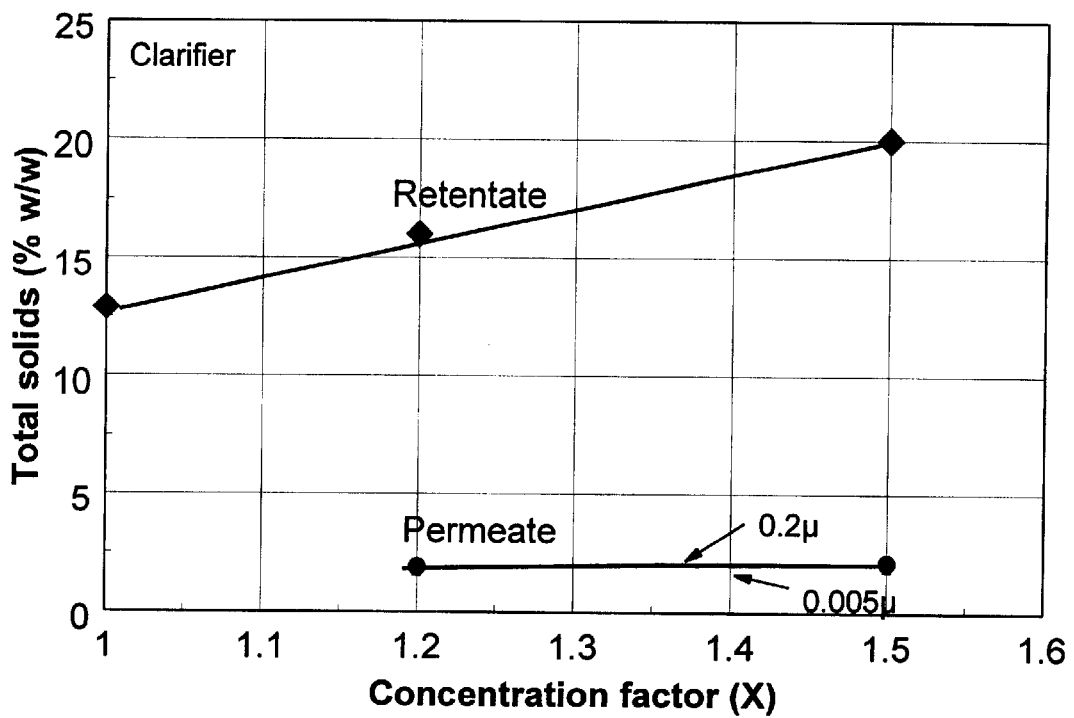
FIG. 5 is a graph of total solids versus concentration factor for (retentate ♦, permeate of 0.2 micron membrane ●) Example 2 in which a ceramic membrane was used in place of a clarifier at a temperature of about 130 degrees F.

FIGS. 4, 5, 6 and 7 show data obtained with the CeraMem membranes. In FIGS. 4 and 5, both membranes were operated together in the same batch recycle system in parallel (retentate returned to the feed tank, permeate removed from the system). FIG. 4 shows an initial flux of about 26 GFD dropping to about 18 GFD at about 1.5x. The tighter membrane gave fluxes of about 15 and 8.6 GFD respectively. The total solids increased from about 12.9 wt % to about 20 wt % in the retentate, while the permeate TS was about 2 wt % TS (the permeate was absolutely clear).

Figure 6:
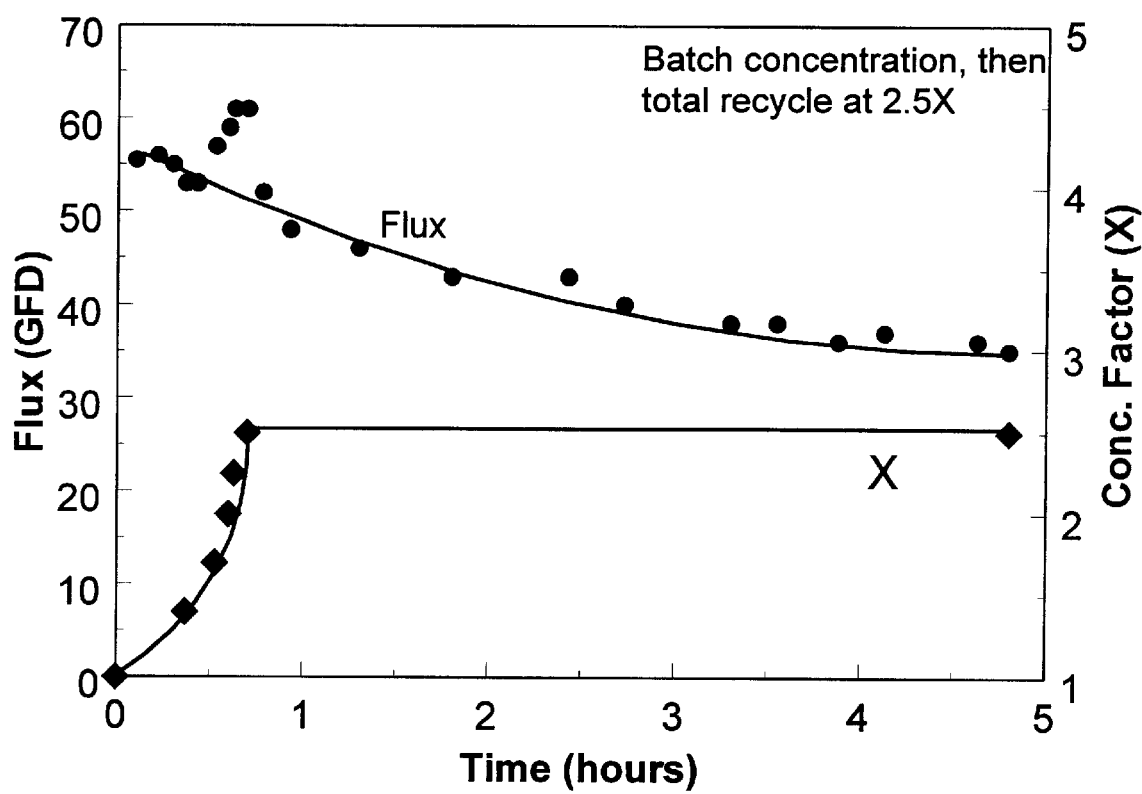
FIG. 6 is a graph of flux (0.2 micron membrane ●) and concentration factor (■) data versus time for Example 2 in which ceramic membranes were used in place of a clarifier at a temperature of about 115 degrees F. Treatment conditions were CeraMem AG1180 (0.2 micron, 2-mm, 1.5 ft$^2$), 115° F., ΔP=5 psi, TMP=22.5, and initial volume=14.4 liters.
Figure 7:
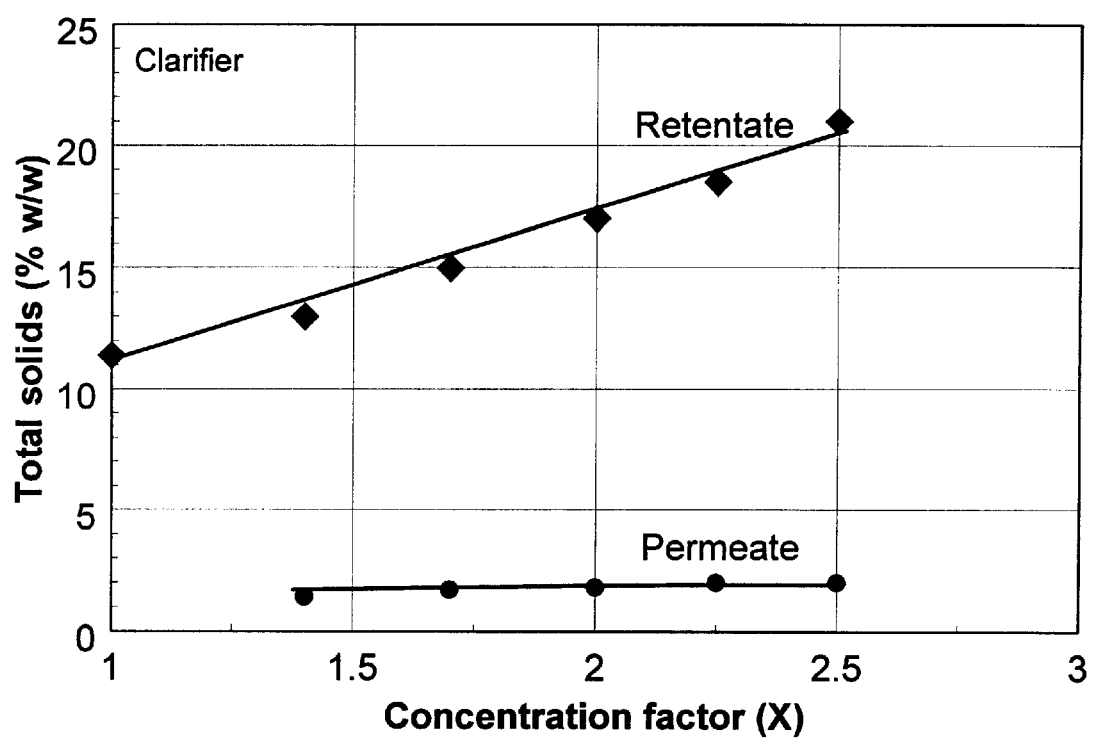
FIG. 7 is a graph of total solids versus concentration factor (retentate ♦) permeate ●) for Example 2 in which ceramic membranes were used in place of a clarifier at a temperature of about 115 degrees F.

A new set of CeraMem membranes were obtained and used in a second run. This data is shown in FIGS. 6 and 7. This second run was operated in a batch concentration mode first up to about 2.5x during which the TS of the retentate increased linearly from about 11.4% to about 22 wt % at about 2.5x (FIG. 7). The permeate TS averaged about 2%. Flux was much better than the previous trial as shown in FIG. 6. A simulated feed-and-bleed (total recycle) at about 2.5x showed fluxes above 35 GFD for 5 hours.

Figure 8:
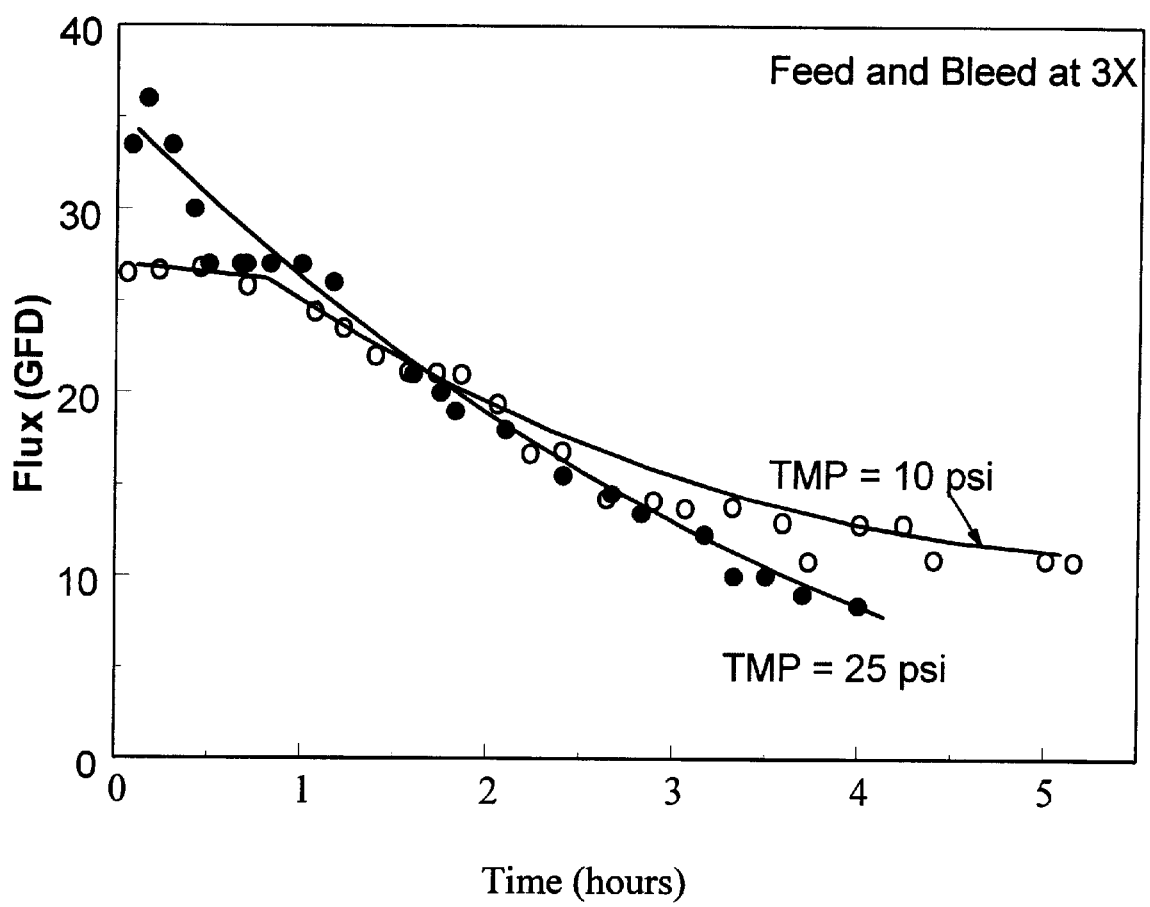
FIG. 8 is a graph of flux versus time in hours (transmembrane pressure of 10 psi ○, transmembrane pressure of 25 psi ●) for Example 2 in which a spiral polymeric membrane was used in place of a clarifier. Treatment conditions were Koch 80-mil spacer, 36 ft$^2$), 115° F., ΔP=10 psi, and feed total solids=12.5–14%.
Figure 9:
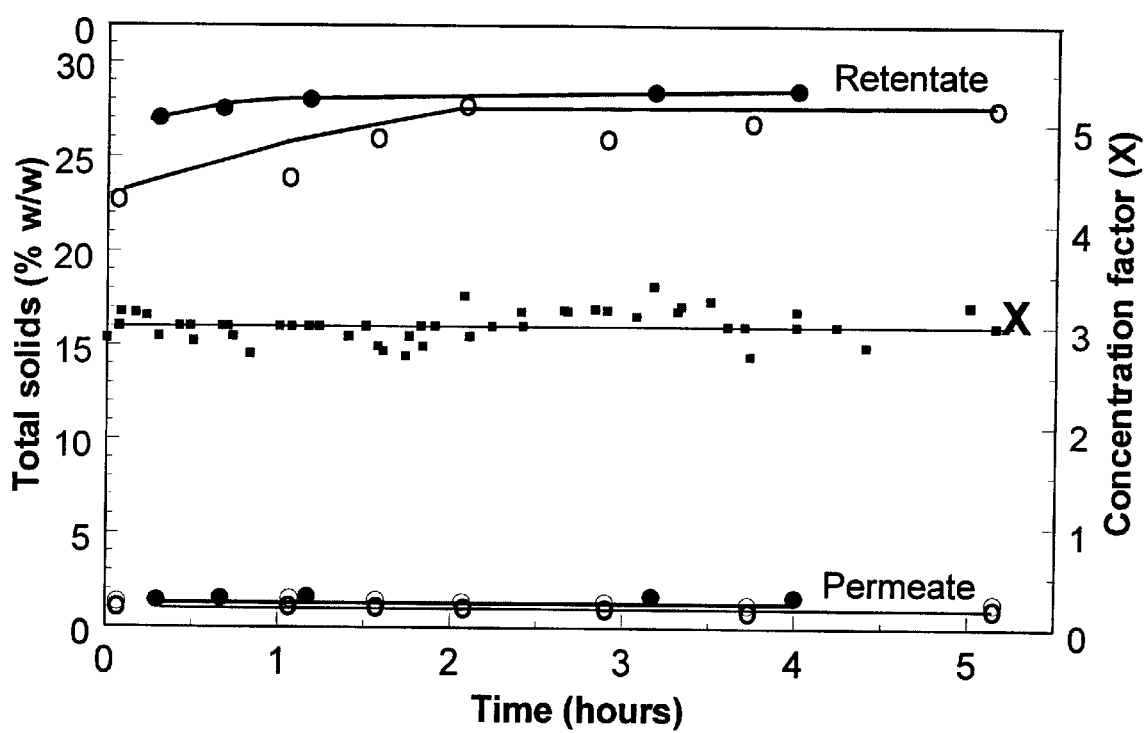
FIG. 9 is a graph of total solids (retentates and permeates at 25 psi transmembrane pressure ●, retentates and permeates at 10 psi transmembrane pressure ○) versus concentration factor (■) for Example 2 in which a spiral polymeric membrane was used in place of a clarifier.

Data obtained with the Koch spiral membrane is shown in FIGS. 8 and 9. Two feed-and-bleed (3x) runs were done with the same clarifier feed at different transmembrane pressure. As expected for membrane filtration, higher pressures initially resulted in higher flux (about 35 GFD vs. about 26 GFD) but resulted in lower flux within a couple of hours. Total solids of retentate at about 3x was about 27 to 28 wt % TS while permeate TS was about 1.3 to 1.6 wt %.

Thus it is expected that using a "membrane clarifier", a 3x to 4x, and possibly even 5x volume concentration should be possible with tubular ceramic membranes with 4–6 mm diameter channels. Conditions predicted in a corn wet milling process involving a membrane clarifier involve starch washings flowing to the membrane at a rate of about 1000 GPM with about 12.5 wt % total solids. If the membrane is a spiral membrane, the flux is about 10 GFD and if it is a ceramic membrane, the flux is about 30 GFD. The volume concentration factor is between about 3 and 5 and the total solids concentration factor is about 2.2. The predicted flow rate of the concentrated starch washings from the membrane filtration step to the primary starch separator is about 333 GPM with about 27 wt % total solids. The recovered aqueous media from the membrane filtration is predicted to have a flow rate of about 667 GPM and about 1.5 wt % TS.

EXAMPLE 3

Starch Purification

Small scale tests for the diafiltration of a starch slurry were conducted. The objective was to remove components of a starch slurry such as but not limited to soluble protein, which can adversely affect performance or sensory aspects of the starch. Restated the diafiltration was meant to purify the starch slurry. A ceramic membrane (Membraflow E196-R module, 6 mm channels, 0.2 micron pore size, 0.36 m$^2$ area) was used in the tests The starch slurry used in the diafiltration tests was prepared by adding about 75 pounds dry starch to about 13 gallons water to arrive at a final volume of about 15 gallons. Starch slurry ° Be was measured at about 20 which correlates to about 35 wt % dry substance (TS). Crosslinked waxy starch was used for these runs but any suitable starch could have been used. The starch slurry had a flowrate of 30 GPM to the membrane, the retentate with a flowrate of about 30 GPM was recycled to the starch slurry stream. Fresh water was added at a flowrate of about 0.2 GPM to the retentate/ starch slurry stream before another round of membrane filtration. The permeate removed by the membrane filtration had a flowrate of about 0.2 GPM.

FIG. 10 shows analytical results for starch and permeate removed from the process at various volume concentration ratios. The process was operated in a batch diafiltration mode where permeate and retentate were recycled to the feed tank until permeate rate could be determined, then permeate removal was done while fresh water was added at the same rate as permeate was removed. Soluble protein from starch dried from slurry samples and for permeate samples are shown in FIG. 10. Permeate samples had a distinct yellow tint that decreased as the volume concentration ratio increased.

All of the processes disclosed and claimed herein can be made and executed without undue experimentation in light of the present disclosure. While the processes of this invention have been described in terms of preferred embodiments, it will be apparent to those of skill in the art that variations may be applied to the processes and in the steps or in the sequence of steps of the method described herein without departing from the concept, spirit and scope of the invention. More specifically, it will be apparent that certain agents, which are chemically and related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A corn wet milling process comprising:
   separating wet milled de-germed corn particles into a fiber component and a first stream comprising water, starch, and protein;
   membrane filtration of the first stream, producing a first retentate enriched in starch and protein and a first aqueous permeate; and
   separating the first retentate into a second stream and a third stream, wherein the second stream comprises water and a majority of the starch present in the first retentate, and the third stream comprises water and a majority of the protein present in the first retentate.

2. The process of claim 1, further comprising washing the second stream with aqueous media; and separating the washed second stream into a fourth stream and a fifth stream, wherein the fourth stream comprises water and a majority of the starch present in the second stream, and the fifth stream comprises greater than about 85 wt % water and less than about 15% dry solids.

3. The process of claim 1, wherein the first stream comprises between about 10% and about 20% dry solids.

4. The process of claim 1, wherein the first retentate comprises from about 20% to 35% dry solids and the % dry solids of the first retentate is higher than that of the first stream.

5. The process of claim 1, wherein the first aqueous permeate comprises up to about 5% dry solids.

6. The process of claim 1, wherein the membrane filtration of the first stream is done with at least one microfiltration membrane selected from the group consisting of spiralwound membranes, tubular membranes, ceramic membranes, and inorganic membranes.

7. The process of claim 6, wherein the microfiltration membrane is a ceramic membrane.

8. The process of claim 6, wherein the microfiltration membrane has a pore size of between about 0.005 microns and 0.2 microns.

9. The process of claim 6, wherein the transmembrane pressure during membrane filtration of the first stream is between about 15 psi and 75 psi.

10. The process of claim 2, further comprising dewatering the fourth stream to produce a sixth stream.

11. The process of claim 2, further comprising membrane filtration of the fifth stream to produce a second retentate and a second aqueous permeate, and wherein the second retentate is combined with the first retentate, and the second aqueous permeate combined with the first stream.

12. The process of claim 11, wherein the fifth stream comprises between about 5% and 15% dry solids.

13. The process of claim 11, wherein the second retentate comprises between about 20% and 30% dry solids.

14. The process of claim 11, wherein the second aqueous permeate comprises less than about 2% dry solids.

15. The process of claim 11, wherein the membrane filtration of the fifth stream is done with at least one microfiltration membrane selected from the group consisting of spiralwound membranes, tubular membranes, ceramic membranes, and inorganic membranes.

16. The process of claim 15, wherein the microfiltration membrane is a ceramic membrane or a spiralwound membrane.

17. The process of claim 15, wherein the microfiltration membrane has a pore size of between about 0.005 microns and 2 microns.

18. The process of claim 15, wherein the transmembrane pressure during membrane filtration of the fifth stream is between about 17 and 75 psi.

19. The process of claim 2, further comprising adjusting the pH of the fourth stream to within the range of 0.5 to 2 pH units below the pasting pH of the starch by addition of alkali to produce an alkali treated stream.

20. The process of claim 19, wherein the dry solids concentration of the fourth stream is adjusted to between about 18 and 45% dry solids prior to adjusting the pH.

21. The process of claim 19, wherein the starch in the fourth stream is chemically modified prior to adjusting the pH of the fourth stream.

22. The process of claim 19, further comprising removing alkaline liquid from the alkali treated stream within about 5 hours of adjusting the pH.

23. The process of claim 19, further comprising washing the alkali treated stream with aqueous media to produce a product starch stream, wherein the pH of the stream remains above about 10 during the washing.

24. The process of claim 23, wherein alkaline liquid is removed from the alkali treated stream prior to washing.

25. The process of claim 23, further comprising drying the product starch stream to produce a dry starch product.

26. The process of claim 25, wherein the dry starch product is gelatinized.

27. The process of claim 23, wherein starch present in the product starch stream is chemically modified.

28. The process of claim 23, further comprising neutralizing the product starch stream by addition of a neutralizing agent to adjust the pH of the solution to between about 6 and 10.

* * * * *